(12) United States Patent
Krupkin

(10) Patent No.: US 9,766,325 B2
(45) Date of Patent: Sep. 19, 2017

(54) COUNTERMEASURE SYSTEM

(75) Inventor: Vladimir Krupkin, Rishon Lezion (IL)

(73) Assignee: ACTIVE AIR LTD., Modiin (IL)

( * ) Notice: Subject to any disclaimer, the term of this patent is extended or adjusted under 35 U.S.C. 154(b) by 727 days.

(21) Appl. No.: 13/880,122

(22) PCT Filed: Oct. 18, 2011

(86) PCT No.: PCT/IB2011/054621
§ 371 (c)(1),
(2), (4) Date: May 21, 2013

(87) PCT Pub. No.: WO2012/052914
PCT Pub. Date: Apr. 26, 2012

(65) Prior Publication Data
US 2014/0147116 A1    May 29, 2014

(30) Foreign Application Priority Data
Oct. 20, 2010 (IL) .......................... 208830

(51) Int. Cl.
| H04K 3/00 | (2006.01) |
| F41F 5/00 | (2006.01) |
| G01S 7/495 | (2006.01) |
| F41G 7/22 | (2006.01) |
| F41H 13/00 | (2006.01) |

(52) U.S. Cl.
CPC ............ *G01S 7/495* (2013.01); *F41G 7/224* (2013.01); *F41H 13/005* (2013.01); *H04K 3/92* (2013.01); *H04K 2203/14* (2013.01); *H04K 2203/24* (2013.01)

(58) Field of Classification Search
CPC ...................................... F41G 7/224
USPC .......................................................... 398/39
See application file for complete search history.

(56) References Cited

U.S. PATENT DOCUMENTS

| 4,830,617 | A | * | 5/1989 | Hancox | ................... F41A 33/02 |
| | | | | | 362/111 |
| 5,115,299 | A | * | 5/1992 | Wright | ................... G11C 16/18 |
| | | | | | 174/564 |
| 5,662,291 | A | | 9/1997 | Sepp et al. | |
| 5,742,384 | A | | 4/1998 | Farmer | |
| 6,190,022 | B1 | | 2/2001 | Tocci et al. | |

(Continued)

FOREIGN PATENT DOCUMENTS

| EP | 1992902 | 11/2008 |
| WO | WO 2007/116403 | 10/2007 |

OTHER PUBLICATIONS

International Search Report and Written Opinion from International Application No. PCT/IB2011/054621 mailed May 4, 2012.

*Primary Examiner* — Ken N Vanderpuye
*Assistant Examiner* — Amritbir Sandhu
(74) *Attorney, Agent, or Firm* — Dorsey & Whitney LLP

(57) ABSTRACT

A laser jammer configured for being a part of a countermeasure system. The system comprises a stage having an axis of rotation and laser source mounted on the stage. The laser source is configured for emitting a laser beam having an optical axis perpendicular to the axis of rotation. The laser has a first spread in a first plane parallel to the rotation axis of the stage and including the optical axis, and a second spread in a second plane perpendicular to the first plane and including the optical axis. The first spread is greater than the second spread.

17 Claims, 9 Drawing Sheets

(56) References Cited

U.S. PATENT DOCUMENTS

| | | | |
|---|---|---|---|
| 6,300,151 B1* | 10/2001 | Yoon | G02B 6/423 |
| | | | 438/106 |
| 6,352,031 B1 | 3/2002 | Barbaccia | |
| 6,359,710 B1* | 3/2002 | Takken | F41G 7/224 |
| | | | 244/3.13 |
| 6,420,720 B1* | 7/2002 | Rubin | F41H 11/02 |
| | | | 244/3.16 |
| 6,429,446 B1* | 8/2002 | Labaugh | F41G 7/224 |
| | | | 244/3.16 |
| 6,587,486 B1 | 7/2003 | Sepp et al. | |
| 6,707,052 B1 | 3/2004 | Wild et al. | |
| 6,977,598 B2 | 12/2005 | Longbottom | |
| 7,212,148 B1* | 5/2007 | Torres | F41H 11/02 |
| | | | 342/13 |
| 7,378,626 B2* | 5/2008 | Fetterly | F41G 7/224 |
| | | | 244/1 R |
| 7,478,578 B2 | 1/2009 | Kirkpatrick | |
| 7,523,692 B1 | 4/2009 | Burns | |
| 7,569,824 B2* | 8/2009 | Gidseg | F41G 7/224 |
| | | | 250/347 |
| 9,310,167 B1* | 4/2016 | Farmer | H01S 3/025 |
| 2003/0128726 A1* | 7/2003 | Tatsuno | G11B 7/127 |
| | | | 372/36 |
| 2004/0239889 A1* | 12/2004 | Inamoto | G03B 21/005 |
| | | | 353/69 |
| 2004/0257262 A1* | 12/2004 | Hoesel | G01S 7/495 |
| | | | 342/13 |
| 2005/0018562 A1* | 1/2005 | Hsiao | G11B 7/0945 |
| | | | 369/47.5 |
| 2007/0075182 A1 | 4/2007 | Fetterly | |
| 2007/0205366 A1* | 9/2007 | Gidseg | F41G 7/224 |
| | | | 250/348 |
| 2008/0056318 A1* | 3/2008 | Kubo | G03G 15/326 |
| | | | 372/38.07 |
| 2008/0174469 A1* | 7/2008 | Stark | F41H 11/02 |
| | | | 342/14 |
| 2008/0191924 A1* | 8/2008 | Duff | G01S 7/38 |
| | | | 342/14 |
| 2008/0219300 A1* | 9/2008 | Krupkin | G01P 5/26 |
| | | | 372/6 |
| 2009/0004918 A1* | 1/2009 | Papanide | H01R 24/44 |
| | | | 439/620.03 |
| 2009/0084252 A1* | 4/2009 | Marquis | F41H 11/02 |
| | | | 89/1.11 |
| 2009/0189785 A1* | 7/2009 | Kravitz | F41G 7/224 |
| | | | 340/945 |
| 2009/0203521 A1* | 8/2009 | Ishimi | B41J 2/442 |
| | | | 503/201 |
| 2009/0224958 A1* | 9/2009 | Aphek | F41G 7/224 |
| | | | 342/54 |
| 2009/0250634 A1* | 10/2009 | Chicklis | F41H 11/02 |
| | | | 250/492.1 |
| 2010/0134041 A1* | 6/2010 | Radermacher | H05B 33/083 |
| | | | 315/294 |
| 2010/0158062 A1* | 6/2010 | Miao | H01S 5/02284 |
| | | | 372/43.01 |
| 2010/0208246 A1* | 8/2010 | Eiselt | H04B 10/07955 |
| | | | 356/213 |
| 2010/0271928 A1* | 10/2010 | Yamazoe | B82Y 10/00 |
| | | | 369/122 |
| 2011/0030763 A1* | 2/2011 | Lewis | C03C 23/0025 |
| | | | 136/246 |
| 2011/0084195 A1* | 4/2011 | Schaub | F41G 7/224 |
| | | | 250/203.2 |
| 2011/0113949 A1* | 5/2011 | Bradley | F41G 7/224 |
| | | | 89/1.11 |
| 2012/0010465 A1* | 1/2012 | Erikawa | A61B 1/05 |
| | | | 600/109 |
| 2012/0213513 A1* | 8/2012 | Chao | H04K 3/42 |
| | | | 398/39 |
| 2012/0243562 A1* | 9/2012 | Maron | H01S 5/0428 |
| | | | 372/9 |
| 2013/0051415 A1* | 2/2013 | Lackey | H03K 3/57 |
| | | | 372/38.02 |
| 2014/0314110 A1* | 10/2014 | Arnone | F41H 13/0056 |
| | | | 372/34 |
| 2014/0368814 A1* | 12/2014 | Krupkin | F41H 11/02 |
| | | | 356/139.08 |
| 2015/0341139 A1* | 11/2015 | Bradley | H04K 3/825 |
| | | | 348/143 |
| 2016/0105254 A1* | 4/2016 | Bodenschatz | H04K 3/43 |
| | | | 455/1 |
| 2017/0102212 A1* | 4/2017 | Radl | F41G 7/224 |

* cited by examiner

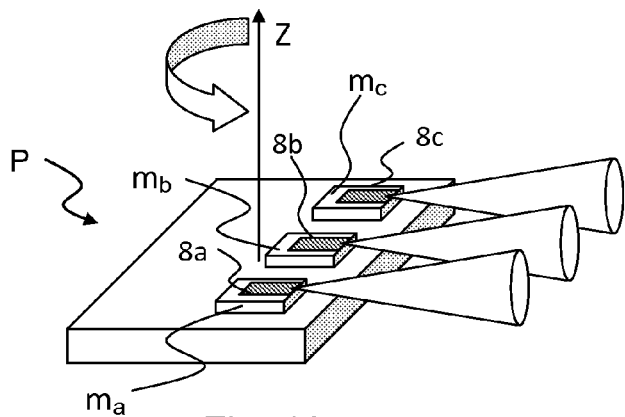 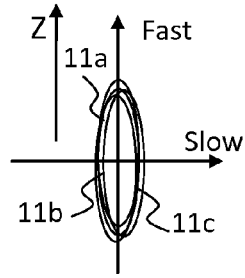
Fig. 4A  Fig. 4B
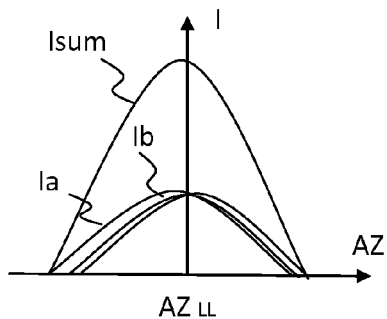 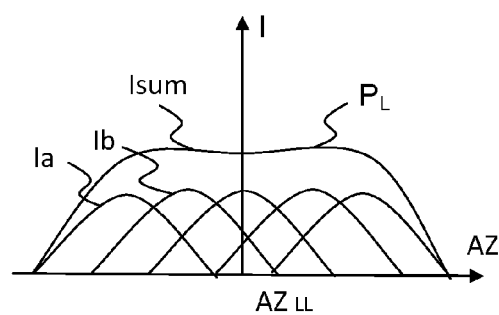
Fig. 5A  Fig. 5B
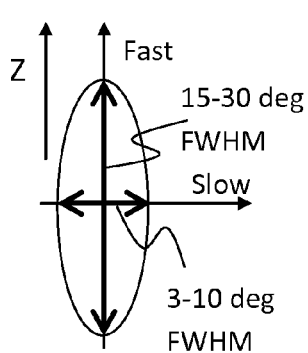 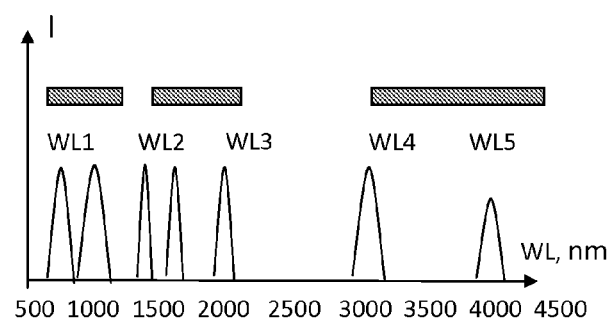
Fig. 6  Fig. 7

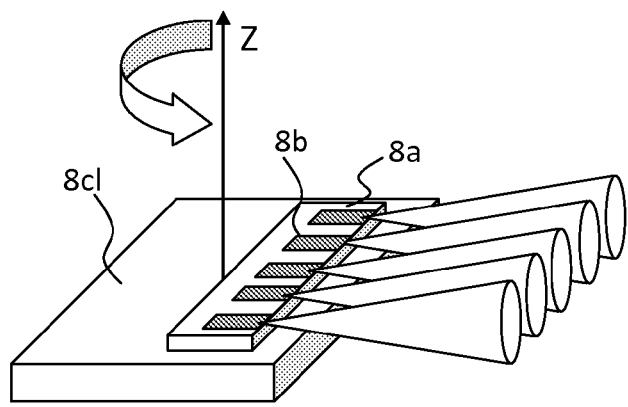
Fig. 8
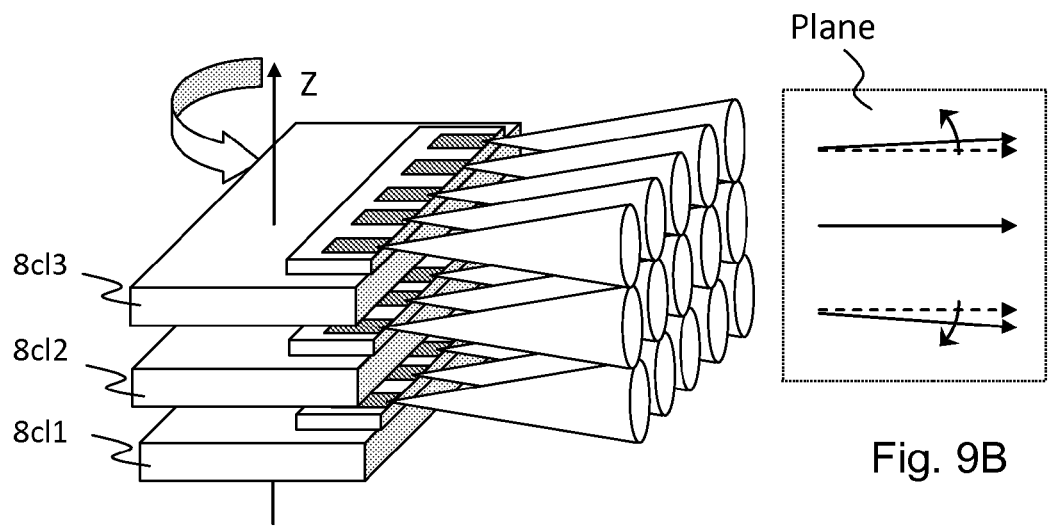
Fig. 9A
Fig. 9B

COUNTERMEASURE SYSTEM

FIELD OF THE INVENTION

This subject matter of the present application relates to infrared countermeasure (IRCM) systems, such as those used by vehicles, buildings, constructions, troops, etc. to effectively counter various threats, e.g., missiles.

BACKGROUND OF THE INVENTION

The proliferation of missiles, especially anti tank guided missiles (ATGM), and their availability to terrorists present a real threat to military vehicles and posts, and to civil objects such as cars, buses, buildings, bridges, airports, seaports, power stations, passenger ships, tankers, aircraft and fuel reservoirs. In addition, ATGM can be used against troops and platoons in urban conflicts. More than half a million guided missiles have been distributed worldwide, and many of these are still operational. A majority of these missiles currently use infrared (IR) sensors to guide them to the target. Typical missiles have ranges of 5-8 km. Known countermeasures range from active IR jamming to flares, smog grenades and chaff.

A variety of countermeasure systems is known, for example, those disclosed in:

U.S. Pat. No. 7,378,626 which discloses a directed infrared countermeasures (DIRCM) system and method;

U.S. Pat. No. 7,478,578 which discloses commercial airliner missile protection using formation drone aircraft;

U.S. Pat. No. 6,977,598 which discloses an aircraft protection system and method;

U.S. Pat. No. 6,359,710 which discloses an IR radiation-seeker missile jammer;

U.S. Pat. No. 6,352,031 which discloses a radiative countermeasures method for protecting an aircraft and other vehicles from infrared "heat seeking" hostile missiles;

U.S. Pat. No. 5,742,384 which discloses a compact scanning infrared countermeasure emitter;

U.S. Pat. No. 5,662,291 which discloses a device for self-defense of aircraft against missiles;

U.S. Pat. No. 7,569,824 which discloses a laser beam steering system and method for use in a directional infrared countermeasures system;

U.S. Pat. No. 7,523,692 which discloses an aircraft defense system against manpads with IR/UV seekers;

U.S. Pat. No. 6,587,486 which discloses a laser beam source for a directional infrared countermeasures (DIRCM) weapon system; and U.S. Pat. No. 6,707,052 which discloses an infrared deception countermeasure system.

SUMMARY OF THE INVENTION

It should be understood that the presently disclosed subject matter of the present application relates to a countermeasure system configured to act against a variety of threats, such threats may, e.g., include: missiles (for example, ATGMs (Anti-Tank Guided Missiles), missile launchers, manned and unmanned aircraft, guided mortars, various types of guided or guiding systems, etc. It should be understood that in the countermeasure system of the presently disclosed subject matter the laser beam can act against threats at various predetermined distances, for example, where a potential missile and/or missile launcher threat may be located and at which the laser countermeasure system of the present subject matter is mostly capable of countering that threat/s. For example, such a predetermined distance may range between 10 meters from the laser source and up to many kilometers.

According to a first aspect of the subject matter of the present application, there is provided a laser jammer configured for being a part of a countermeasure system, comprising:

a stage having an axis of rotation; and a laser source mounted on said stage and configured for emitting a laser beam having an optical axis perpendicular to the axis of rotation, a first spread in a first plane parallel to the rotation axis of the stage and including the optical axis, and a second spread in a second plane perpendicular to the first plane and including the optical axis, said first spread being greater than said second spread.

According to a second aspect of the subject matter of the present application, there is provided a laser jammer configured for being a part of a countermeasure system, and for operation against threats at predetermined distances, comprising:

a laser source comprising a plurality of laser emitters configured for being activated and for emitting in unison their corresponding laser emitter beams having respective optical axes, such that the optical axes of at least two laser emitters define therebetween an angle which is at least 0.01 degrees and no more than 45 degrees;

the laser emitter beams forming together a combined laser beam having a predetermined spread along its optical axis;

the combined laser beam being spectrally uniform at least at a majority of its spread, at the predetermined distances; and a minimum intensity of laser radiation in the majority of the spread is more than 50% of an average intensity of laser radiation in the majority of the spread, at the predetermined distances.

According to a third aspect of the subject matter of the present application, there is provided a laser jammer configured for being a part of a countermeasure system, comprising:

a laser source comprising a plurality of pulsed laser emitters each comprising a laser diode;

a plurality of substrates each of which holds at least one of the laser diodes;

at least one first heat sink comprising a first metal plate on which one or more of the substrates is placed so as to be in thermal contact therewith being free of permanent attachment to the plate, the one of more substrates having a total heat capacity lower than that of the first metal mounting plate;

a second heat sink which is in contact with the first heat sink and which comprises a thermo-electric cooler and a second metal plate, the thermo-electric cooler being disposed between the first heat sink and the second metal plate, and the second metal plate having greater heat capacity than the first metal plate.

According to a fourth aspect of the subject matter of the present application, there is provided a laser jammer configured for being a part of a countermeasure system, comprising:

a laser source comprising at least two adjacent compartments each being hermetically sealed and having a wall therebetween hermetically separating the compartments from each other;

a first of the two compartments comprising therein a plurality of laser emitters, and the second compartment comprising therein capacitors electrically connected to the laser emitters via electrical connections passing through the wall and connected to an external charger, and a switch for activating of the laser emitters via the capacitors, wherein at least one of the following conditions are met:

the laser source is configured to provide laser pulses having a peak power above 100 Watts, particularly above 1000 Watts, and having a leading edge of laser pulse duration of less than 5 microseconds, particularly less than 2 microseconds;

the laser source is configured to provide a laser pump current amplitude above 100 Amperes, particularly above 200 Amperes, and having a leading edge of laser pulse duration of less than 5 microseconds, particularly less than 2 microseconds; and the laser source having a peak specific optical laser power (i.e. power per unit of volume, the peak corresponding to the peak power amplitude) of at least 10 Watts/CC (cubic centimeter), particularly at least 30 Watts/CC.

According to a fifth aspect of the subject matter of the present application, there is provided a method for disturbing guidance communication between a control unit and a missile controlled by the control unit, whose missile or control unit coordinates have been determined by a detector, comprising:

(a) providing a laser jammer having a movable laser source configured to emit a laser beam;
(b) directing the laser source towards the missile or control unit according to the coordinates; and
(c) emitting the laser beam by means of the laser source, thereby disturbing the guidance communication from the control unit to the missile.

In an example of a laser jammer according to the above aspects, the laser emitters emit laser emitter beams forming together a combined laser beam having a predetermined spread along its optical axis.

In an example of a laser jammer according to the above aspects, the laser beam has a first spread and a second spread in respective planes that are parallel to its optical axis and are perpendicular to each other, the first spread being greater than the second spread.

In an example of a laser jammer according to the above aspects, the first spread is least 1.5 times, particularly, at least 3 times, more particularly, at least 8 times greater than the second spread.

In an example of a laser jammer according to the above aspects, the first spread is at least 0.5 degrees, particularly, at least 1 degree, more particularly, at least 3 degrees, and no more than 45 degrees, particularly, no more than 30 degrees.

In an example of a laser jammer according to the above aspects, the second spread is at least 1 degree, particularly, at least 5 degrees, more particularly, at least 15 degrees, and no more than 120 degrees, particularly, no more than 90 degrees.

In an example of a laser jammer according to the above aspects, the laser jammer is configured for operation against threats at predetermined distances.

In an example of a laser jammer according to the above aspects, laser source is an IR laser source.

In an example of a laser jammer according to the above aspects, the laser source is configured for emitting the laser beam with a predetermined spectral distribution at least a portion of which is in a range of 780 nm-4300 nm.

In an example of a laser jammer according to the above aspects, the spectral distribution is non-continuous.

In an example of a laser jammer according to the above aspects, the laser source is configured for emitting the laser beam in at least one pulse being no longer than 5 seconds, particularly, no longer than 0.5 seconds, more particularly, no longer than 1 msec.

In an example of a laser jammer according to the above aspects, the laser jammer further includes optical means configured for at least one of the following: focusing, defocusing or collimating the laser beam.

In an example of a laser jammer according to the above aspects, the laser source comprises a plurality of laser emitters.

In an example of a laser jammer according to the above aspects, the laser emitters have at least two of their characteristics of size, mass and volume, the same for at least a majority of the emitters.

In an example of a laser jammer according to the above aspects, the laser emitters are arranged along two dimensions of the laser source.

In an example of a laser jammer according to the above aspects, the laser emitters are laser diodes.

In an example of a laser jammer according to the above aspects, further comprises a plurality of substrates each of which holds at least one of the laser diodes.

In an example of a laser jammer according to the above aspects, at least one of the substrates is mostly made of a semiconductor and the laser diodes are formed therein.

In an example of a laser jammer according to the above aspects, at least one of the substrates is mostly made of a semiconductor and the laser diodes are mounted thereon.

In an example of a laser jammer according to the above aspects, at least one of the substrates is mostly made of metal and the laser diodes are mounted thereon.

In an example of a laser jammer according to the above aspects, the laser jammer further comprises LEDs in the visible spectrum.

In an example of a laser jammer according to the above aspects, the visible spectrum LEDs produce a beam directed along the same optical axis as the laser beam and/or having a predetermined spread similar to that of the laser beam.

In an example of a laser jammer according to the above aspects, the first heat sink further comprises an additional metal plate which is in thermal contact with the first metal plate, and wherein the one or more of the substrates with the corresponding laser diodes extends between the first and additional metal plates in thermal contact therewith.

In an example of a laser jammer according to the above aspects, the first metal plate together with the one or more substrates placed thereon is movable with respect to the second heat sink.

In an example of a laser jammer according to the above aspects, the first metal plate together with the one or more substrates placed thereon is movable by means of a sub-mount attached thereto, for example, a c-mount.

In an example of a laser jammer according to the above aspects, the substrates are movable by means of sub-mounts attached thereto, for example, c-mounts.

In an example of a laser jammer according to the above aspects, the first and second metal plates are made of the same material and the second plate has a greater volume than the first plate.

In an example of a laser jammer according to the above aspects, the second heat sink is mounted on a third heat sink.

In an example of a laser jammer according to the above aspects, the third heat sink comprises a rotation stage.

In an example of a laser jammer according to the above aspects, the laser jammer further comprises a stage having an axis of rotation and the laser source is mounted on the stage.

In an example of a laser jammer according to the above aspects, the axis of rotation is a single axis of movement of the stage.

In an example of a laser jammer according to the above aspects, angular accuracy of the rotation stage is between 1 and 10 degrees.

In an example of a laser jammer according to the above aspects, the emitters are arranged to have fast axis parallel to the axis of rotation of rotation stage.

In an example of a laser jammer according to the above aspects, the laser emitters are installed at a distance of no more than 10 cm, particularly, no more than 5 cm from the capacitors.

In an example of a laser jammer according to the above aspects, the laser emitters are connected to the capacitors by means of electrical connectors that are no longer than 10 cm, particularly, no longer than 5 cm in length.

In an example of a laser jammer according to the above aspects, the adjacent compartments have walls made of cast glass.

In an example of a laser jammer according to the above aspects, the laser beam is spectrally uniform at least at a majority of its spread, at the predetermined distances, and a minimum intensity of laser radiation in the majority of the spread is more than 50% of an average intensity of laser radiation in the majority of the spread, at the predetermined distances.

In an example of a laser jammer according to the above aspects, the minimum intensity of laser radiation in the majority of the spread is more than 80% of the average intensity of laser radiation in the majority of the spread.

In an example of a laser jammer according to the above aspects, the laser jammer is configured for disturbing guidance communication between a control unit and a missile controlled by the control unit, after the missile's or control unit's coordinates have been determined by a detector.

In an example of a laser jammer according to the above aspects, the control unit is at or adjacent the launch site of the missile.

In an example of a laser jammer according to the above aspects, in a case where the missile's coordinates are to be detected by the detector, and the missile is expected to be spaced from the launch site at the time of detection by an angular distance within an expected range relative to the laser jammer, the first and second spreads are selected to include the range.

In an example of a laser jammer according to the above aspects, the laser jammer further includes a third compartment adjacent to the second compartment, the third compartment being hermetically sealed and comprising therein a logic card (i.e. a processor, memory, etc.) configured to activate the switch and the charger configured to charge the capacitors.

It should be understood that that the countermeasure system of the presently disclosed subject matter can comprise more than one laser source and more than one rotation stage.

According to an example of the presently disclosed subject matter, a light weight infrared countermeasure system for protection of vehicles, constructions and troops, is provided, including a high power pulsed multi emitter semiconductor laser mounted on a rotation stage and a detector of direction to the launching location of threat missile. The laser has moderate far field horizontal beam spread and large far field vertical beam spread to insure illumination of launching location even for low angular accuracies of the detector and of the rotation stage. The laser emits pulsed radiation in the direction of the launching location. This disturbs operation of control of the attacking missile, resulting in deflection of the missile.

One of the objects of the presently disclosed subject matter may be to provide effective low cost low weight reliable defense systems against ATGMs. The systems comprise a high power low cost laser having large beam spread, a rotation stage and a detector of direction to the launching location of threat missile. The systems respond to signals from the detector, the rotation stage turns the laser to direct it towards the launching location, and the laser emits a high power laser beam that disturbs operation of control of the attacking missile resulting in deflection of the missile.

In an example of the presently disclosed subject matter, the laser is composed of a plurality of low cost reliable pulsed semiconductor laser emitters, providing desired large spread high power laser beam. The semiconductor laser is smaller, lighter, more efficient, more powerful and less expensive than other lasers that are used in prior art to create narrow (small spread) laser beams. The rotation stage is compact and low cost because it has only one single axis of rotation, and due to relaxed requirements for pointing accuracy and for dynamics and due to low weight load of the laser. The detection system may be low cost because it only needs to provide one coordinate (azimuth to launching location) at low accuracy. The laser beam is emitted in the direction of launching location of threat missile. Therefore it illuminates optics and detectors of control circuits of attacking missile. The optics and detectors can be located on the attacking missile itself in an optical head of the missile, or at the sides, wings or tail of the missile. The optics and detectors can be also be located outside of the missile in a separate control unit or launching control site. The laser beam illuminates the attacking missile and the separate control unit, and objects in proximity of missile path and in proximity of control unit, due to large spread of the beam. The laser can be quasi continuous wave (QCW), pulsed or modulated so that average power of the laser is less than the peak power of the laser. High power laser radiation disturbs operation of the detectors and prevents correct control of attacking missile. The missile changes its flight path in accordance with incorrect control signal, it flights in wrong direction. In about a second the missile is displaced from its attacking path so far that it cannot recover control, even if the high power laser stops acting or is redirected. This results in deflection of the missile from protected objects and locations. The system is instantly ready for deflection of another attacking missile. Therefore, the system is capable of acting as a continuously operable reliable countermeasures system capable of deceiving attacking missiles by emission of the high power laser beam generally in the direction of a missile's launching location.

The following are some of the objects and advantages of the presently disclosed subject matter:
  To deceive attacking missiles by emission of high power laser in the direction of the missiles' launch site.
  To deceive various types of threats, for example, by using a high power large spread laser that illuminates simultaneously the threat, a separate control unit of the threat and objects in proximity of the threat and of the control unit.
  To provide automatic defense for vehicles, troops, constructions, etc. without the need for a human operator.

To provide a compact countermeasure system, for example, by incorporating a pulsed modulated laser having average power which is less than the peak power of the laser.

To provide an efficient lightweight countermeasure system requiring a relatively low power drain from a power supply, which is uniquely adaptable for man portable use and for use on light vehicles.

To provide a low cost countermeasure system, for example, by reducing its complexity, reducing the amount of system components, and relaxing requirements from the components.

To provide a reliable countermeasures system, for example, by reducing complexity of the system and accuracy requirements, laser cooling, and increasing the reliability of the laser.

To provide a defensive system that is not hazardous to people, equipment and structures.

To provide a defensive system that requires no or few consumables.

To provide a defensive system that doesn't require hazardous replenishment ground operations.

To provide a defensive system that is very quickly deployable and having a short response time.

To provide a defensive system that is difficult to detect.

To provide a defensive system that is not required to perform threat tracking, but rather may only perform one-time detection, e.g., detection of a missile launch.

Other objects, features and advantages of the presently disclosed subject matter will become apparent after consideration of the following detailed specification together with the appended drawings.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 4A is a schematic diagram of a countermeasure system according to another example of the subject matter of the present application, including placement and orientation of multiple lasers on a mounting plate, with respect to the axis of rotation of the rotation stage;

FIG. 4B is a schematic diagram of orientation and superposition of laser beam spreads of the multiple lasers shown in FIG. 4A, with respect to the axis of rotation of the rotation stage;

FIG. 5A is a schematic representation of orientation and superposition of laser beam spreads of multiple lasers shown in FIG. 4A when the spread of each laser is close to a desired laser beam spread;

FIG. 5B is a schematic representation of orientation and superposition of laser beam spreads of multiple lasers shown in FIG. 4A when spread of each laser is smaller than desired laser beam spread;

FIG. 6 is a schematic representation of orientation and shape of laser beam of the system in accordance with an embodiment of the presently disclosed subject matter;

FIG. 7 is a schematic representation of an optical spectrum of the system of FIG. 6, including preferred wavelengths of the lasers and operational bands of countermeasure systems in accordance with the presently disclosed subject matter;

FIG. 8 is a schematic diagram of placement and orientation of array of multiple lasers on mounting plate with respect to axis of rotation of the rotation stage in accordance with another embodiment of the subject matter of the present application;

FIG. 9A is a schematic diagram of placement and orientation of several arrays of lasers shown in FIG. 8, on multiple mounting plates with respect to axis of rotation of the rotation stage;

FIG. 9B is a schematic side-view representation of the direction of laser beams used in the array shown in FIG. 9A;

DETAILED DESCRIPTION OF EMBODIMENTS

Figure 1:
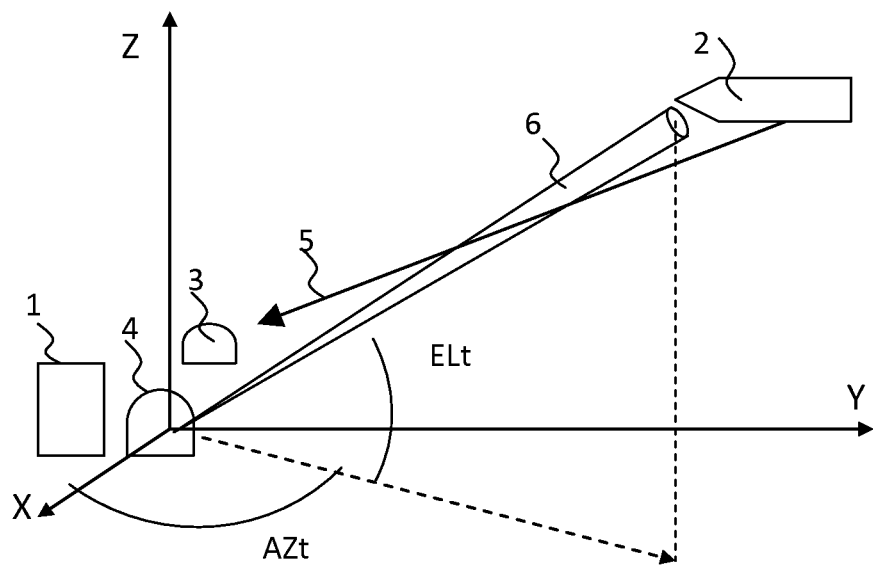
FIG. 1 is a diagram of a DIRCM system against homing missiles according to prior art.

Attention is drawn to FIG. 1, in which a countermeasure system according to the prior art is shown. In the present example, target 1 is a vehicle, for example a tank, which is attacked by missile 2. The missile 2 is configured for being detected by detector 3 of a countermeasure system, located in the vicinity of the target 1. The detection of the missile 2 is implemented via detection of radiation of the missile's engine or engine exhaust. The countermeasure system includes a directed laser 4 which is comprised of a narrow divergence laser, an optical transmitting telescope module and a bi-axial laser beam deflector or a bi-axial gimbal pivot. Arrow 5 indicates the direct line of sight from the missile exhaust to the detector, which is used to calculate the required orientation—Azimuth (Azt) and Elevation (Elt) of the laser beam deflector of the directed laser 4.

Following proper orientation of the directed laser 4, it emits a narrow laser beam 6 towards the missile 2 which is configured for hitting the optical head of the missile 2, and, if it is powerful enough, to disrupt the detectors of the missile 2. It is important to note that the missile's 2 optical head and missile exhaust are located at different locations, which complicates direction and pointing of the directed laser 4 dramatically.

Figure 2:
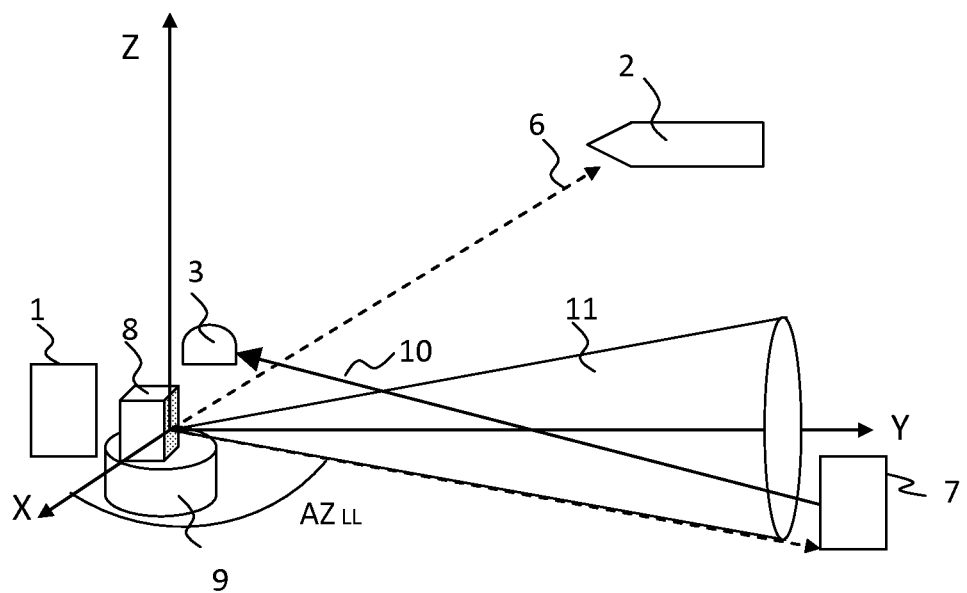
FIG. 2 is a schematic diagram of a countermeasure system in accordance with the presently disclosed subject matter.

Turning now to FIG. 2, a countermeasure system according to the disclosed subject matter of the present application is shown, generally designates as S, and configured for protecting a target 1 (a vehicle, a structure or a soldier) from an incoming threat 2. The system S includes a detector 3, a high power laser 8 and a single axis rotation stage 9.

The detector 3 is configured for detecting a control unit 7 of the missile 2, and to define an approximate direction to the missile's 2 launching position, which is indicated by arrow 10. Detection is performed by sensing at least one of the following:

IR radiation of the hot missile engine;
optical missile engine exhaust; and
reflection of radio waves (radar sensing).

For example, the detector 3 can be a perimeter surveillance phased array radar configured for detecting azimuth of launching location. Alternatively, the detector 3 can be an infrared or thermal sensor array configured for detecting azimuth of launching location. It is, however, appreciated that the system can comprise a plurality of detectors of various types, each type of detector being configured for detecting a different parameter of the threat.

The countermeasure system S can thus be incorporated with various detectors. In one embodiment, a detector is configured for determining coordinates of a launch site. In another embodiment, the detector is configured for determining only the coordinates (direction to) of the missile.

It is noted that the difference in directions to the missile's launch site and to the missile, detected as it is launched, is typically relatively small (about 1 degree) due to their physical proximity to each other. In addition, in the majority of cases, the missile's control unit 7 is located at or adjacent to the launch site (see FIG. 3A).

Under this premise, in some embodiments of the system S, the laser jammer is configured for producing a laser beam having a spread that is greater than this difference, i.e. a great spread in the vertical direction. Consequently, the laser jammer illuminates both the launch site and the missile 2, when directed to the latter.

The rotation stage 9 is a single axis rotation stage, which is configured for rotating about a vertical axis to an angle $Az_{LL}$ in order to direct the laser 8 towards the launching position of the missile 2, where control unit 7 of the missile 2 is located.

The rotation stage 9 is typically configured for being mounted on a base surface, e.g. ground, vehicle, a soldier's carrying platform, etc., so that the axis of rotation is perpendicular to the base surface. In some embodiments, the axis of rotation is designed so that it is substantially aligned with the vertical axis.

In operation, the detector 3 detects the approaching missile 2, and provides a signal to the rotation stage 9 indicative of the position of the missile 2. Based on said signal, the stage 9 revolves about the vertical axis to an angle $Az_{LL}$, thereby pointing the laser 8 towards the missile 2.

Thereafter, the laser emits a wide spread laser beam 11, which illuminates the control unit 7 with high power radiation. Detectors of the control unit 7 are disrupted by the laser beam, thereby preventing proper operation of the control unit 7. Once the control unit stops providing proper control to missile 2, the latter is caused to deviate from its proper attacking flight path.

Figure 3A:
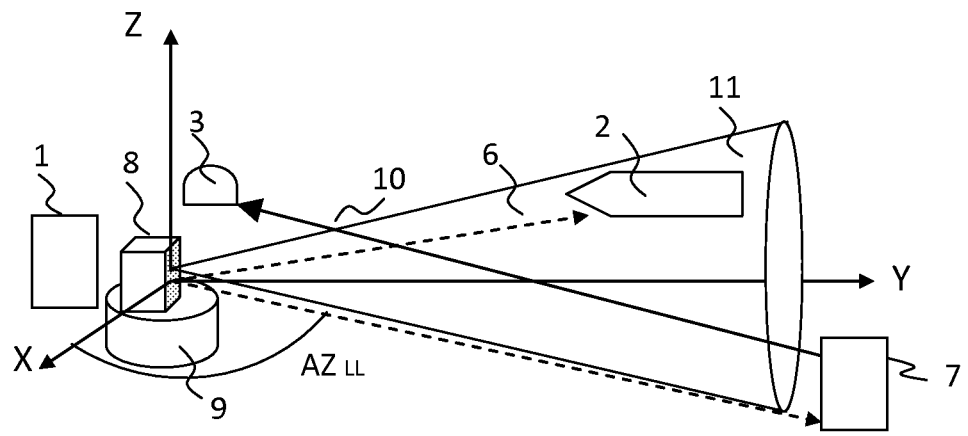
FIG. 3A is a schematic diagram of the countermeasure system shown in FIG. 2, under an attack of a missile flying within the laser beam.

Turning now to FIG. 3A, the countermeasure system S when the missile 2 is flying low, which is typical for an Anti-Tank Guided Missile (ATGM). In this case the control unit 7 and the missile 2 are both illuminated by the laser beam 11, thereby disrupting both the forward looking optical heads of the missile 2 and the guiding means of the sight 7.

Figure 3B:
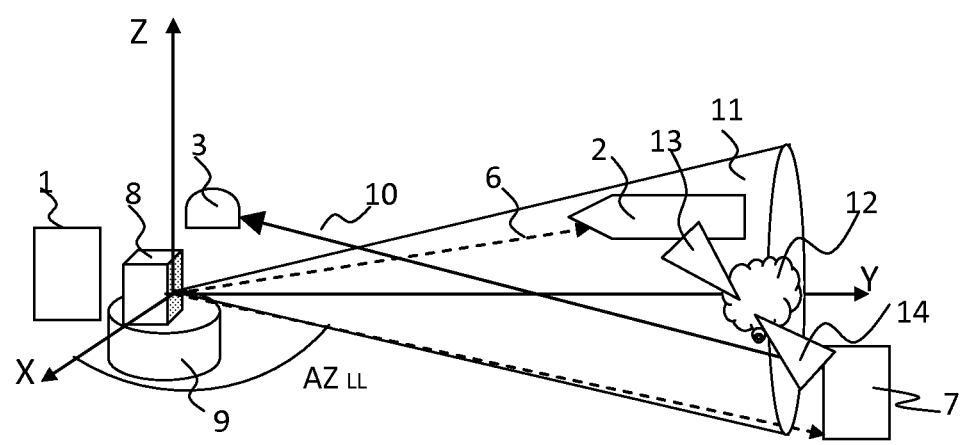
FIG. 3B is a schematic diagram of the countermeasure system shown in FIG. 3A, illustrating reflections from objects in the laser beam towards the control unit and the missile.

Turning now to FIG. 3B, it is observed that the space between the missile 2, sight 7 and countermeasure system S can include additional unrelated objects 12 such as vehicles, trees, smog, buildings etc. Some objects can affect the beam of the laser 8 by scattering reflection of the laser light (trees, stones, walls), and some objects can affect it by providing specular reflection (windows, water). It is appreciated that such reflections 13, 14 can also illuminate the control unit 7 or the missile 2, introducing additional deflection capabilities.

Turning now to FIGS. 4A and 4B, a base platform is shown, generally designated as P, and having mounted thereon a plurality of lasers 8a, 8b, 8c in a predetermined placement and orientation.

The platform, in this example a metal mounting plate, is configured for revolving with respect to a rotation axis Z, which, when the platform is mounted onto a vehicle/ground etc., is configured for being aligned with the vertical direction. The arrangement is such that when the rotation stage rotates, the laser beam rotates with it along the horizontal plane.

Each of the lasers 8a, 8b, 8c can be mounted on the mounting surface in substantially the same way, and is configured for emitting radiation in approximately the same direction. In particular, one or more of the laser 8a, 8b, 8c can be semiconductor lasers located on individual mounting plates for manipulation, cooling, alignment and fixing of the semiconductor lasers.

In the present example, individual mounting plates $m_a$, $m_b$, $m_c$ are located on the mounting plate P, and semiconductor lasers 8a, 8b, 8c are located on the individual mounts $m_a$, $m_b$, $m_c$ respectively.

With particular reference to FIG. 4B, each of the lasers 8a, 8b, 8c has a slow axis (broad dimension transverse to the laser emission direction) parallel to the mounting surface of the mounting plate or individual mounts, and a fast axis (narrow transverse direction—height) parallel to the axis of rotation Z of the mounting plate P. In this case, the lasers' output (combined) beam axis is in a horizontal direction. It is observed that the laser beam's spread is narrow in the horizontal plane and wide (i.e. high) in the vertical plane.

The total output laser beam power is proportional to the amount of individual laser emitters (when similar emitters are used). The laser source may include focusing, defocusing or collimating optics, however, in another example the spreads of the individual laser emitter beams can form the combined spread of the laser beam of the entire system. Specifically, when the laser emitters are aligned in the same direction—the individual far field spread of each laser emitter beam can be similar to the spread of the laser beam.

Alternatively, the laser emitters can be arranged having different orientations with respect to the (combined) laser beam's direction, so that the laser beam spread is larger than a far field spread of individual laser emitter beams.

With particular reference being drawn to FIG. 4B, the orientation and superposition of laser beam spreads 11a, 11b, 11c of multiple laser emitters is shown with respect to the axis of rotation of the rotation stage P. The laser beam's spread is sufficiently large in the vertical direction, which in this case corresponds to the direction of axis Z. However, it is observed that the laser beam's spread in the horizontal direction is relatively small.

As a result of the above spread, while the beam covers a wide area spanning along the vertical direction, it covers a substantially narrower area in the horizontal direction, whereby turning of the rotation stage is required to place the laser beam on the control unit 7 and/or the missile 2.

It is appreciated that the great vertical spread of the laser beam can account for terrain altitude variations, or alternatively, a tilt of a single axis rotation stage with respect to the horizontal plane, thereby still enabling the laser beam emitted towards a threat located substantially horizontal or oppositely tilted direction with respect to the laser, to still illuminate the threat with radiation. The stage can thus be free of means for its linear translation.

Turning now to FIG. 5A shows an exemplary orientation and superposition of laser beam spreads of multiple lasers when the spread of each laser emitter's beam is close, along the AZ direction, to the desired (combined) laser beam spread of the system. Laser beams of individual lasers Ia, Ib, Ic are superimposed, resulting in an increased intensity Isum of a high power laser. It is observed that, in the present example, the spread of the laser beam remains unchanged.

It is important to note that each individual laser has random speckles or locations of low intensity, so called "holes" (not shown). The location and distribution of speckles is different for each individual laser emitter beam. When many laser emitter beams are added together, maximums of one beam overlap with minimums of another beam, so that the overall sum intensity distribution (or laser power distribution) becomes more homogeneous with an increasing amount of individual laser beams. As a result, the high power beam demonstrates no speckles ("holes").

It is also appreciated that individual lasers are not required to be coherent with one another, and each may have different wavelengths and phases. The differences between the individual lasers can be very small, yet it is sufficient to prevent phase correlation and interference therebetween. The sum beam thus includes radiation at all wavelengths and phases of the individual lasers, and they are superimposed to provide a sum of intensities.

Correspondingly, modulations of intensity of sum beam (combined laser beam) are reduced, thus making the sum laser beam substantially homogeneous (having a substantially smooth intensity spread). When the laser emitters are configured to emit their individual laser emitter beams at different wavelengths, the resulting sum beam is also substantially spectrally uniform, i.e., the laser emitters are arranged so that the different wavelengths of the individual laser emitter beams are present substantially in all of the main portion (the majority) of the sum beam's spread and individually, per wavelength, have a substantially homogeneous distribution.

Turning now to FIG. 5B, another example of orientation and superposition of laser beam spreads of multiple laser emitters is shown, in this case, when the spread of each laser is smaller, along the AZ direction, than the desired laser beam spread of the system.

Under this arrangement, the direction of each individual laser is changed in a way that superposition of laser beams Isum has a wide substantially homogeneous spread at the optical axis, having a plateau portion $P_L$ along its spread in the AZ direction. The spread of the laser beam is chosen such that the value of intensity at the plateau portion $P_L$ is sufficient for deflecting a threat (for example, for a missile—by disturbing its guidance communication with the control unit and/or directly affecting its homing head). Optimization of laser beam distribution in this way results in improved efficiency, reduced cost and reduced power consumption of the system.

Attention is now drawn to FIG. 6 illustrating orientation and shape of a laser beam of the system in accordance with an embodiment of the presently disclosed subject matter. A horizontal Full Width Half Maximum (FWHM) spread of the laser beam is about 3-10° (degrees) and a vertical FWHM spread of laser beam is about 15-30° (degrees). The term 'FWHM spread' a used herein refers to a spread (in degrees) corresponding to the full value of the irradiance at Half Maximum of its distribution function. In simpler terms, one can refer to the entire spread of the laser beam, as measured in degrees according to respective axes. The axis of rotation of the rotation stage is vertical, so the laser beam can be rotated in the horizontal plane. Other embodiments can have larger ranges of angles, for example 5-90 degrees in the vertical plane and 1-30 degrees in the horizontal plane. Such a beam may have a lower intensity, but it illuminates a larger angular sector and supports defensive systems having larger tolerances and having to deal with greater uncertainties of angular coordinates.

Reference is now made to FIG. 7, which shows an exemplary optical spectrum of the countermeasure system including some preferred wavelengths of the lasers and operational bands of countermeasure systems in accordance with the presently disclosed subject matter. The operational bands are effected by transparency windows of the atmosphere, spectral sensitivity of detectors applied in the missiles and in control units of missiles, operational wavelengths of missiles, and by wavelengths of high power lasers that can be built at low cost with high reliability.

Generally, the total range of operational wavelengths is from approximately 780 nm to 4300 nm. Specifically, the operational bands can be in the range of 780 nm to 1100 nm, 1450 nm to 2200 nm and 3200 nm to 4300 nm. Operational wavelengths of low cost high power lasers are 780-815 nm, 880 nm, 905-990 nm, 1020-1070 nm, 1500-1600 nm, 1700-2100 nm, 3900 nm-4100 nm, and there are other wavelengths that can be achieved in a cost effective way.

The countermeasure system of the present application can operate at a single wavelength, for example if the type of threat is already known, and thus use that specific wavelength to neutralize the threat. In other cases, a laser beam having a few wavelengths can be incorporated, to provide response to several types of threats or to sophisticated threats. In some embodiments, the laser jammer is configured to produce a laser beam with wavelengths in the spectral range of up to 20 microns, particularly 4 to 20 microns, more particularly 6 to 16 microns and even more particularly 8 to 12 microns.

In addition, the countermeasure system can include a laser jammer which is configured to include visible spectrum and/or ultra-violet LEDs which emit laser emitter beams forming the combined laser beam or separate beams directed in substantially the same direction as the combined laser beam.

Turning now to FIG. 8, a diagram of placement and orientation of an array of multiple lasers 8*a*, 8*b* etc. on a mounting plate 8*cl* is shown, with respect to axis of rotation stage Z. Each single laser 8*a* can be a single semiconductor laser emitter. Arrays of semiconductor lasers (laser bars) are used for scaling up power of semiconductor lasers in a cost effective way. An array of semiconductor lasers (laser diodes) is typically 10 mm wide, and typically includes more than 50 single emitters. When compared to width of a single emitter (0.05-0.2 mm), a dramatic increase of power is achieved, for example from a few watts of a single semiconductor laser emitter, to a few hundred watts for an array of semiconductor laser emitters. The laser bars have their slow axis parallel to the mounting surface of the mounting plate so, and in accordance with the present example, the mounting surface is designed to be disposed in a horizontal manner (normal to the rotation axis Z), as shown in FIG. 8.

Turning now to FIGS. 9A and 9B, the laser bars are formable into stacks (or arrays) of laser bars oriented in a similar way and mounted together on their respective metal mounting plates. Laser stacks are used to increase laser power to the highest level achievable with semiconductor lasers. Laser power of laser stacks is typically in a range of 1 kW to 100 kW. Conventional stacks only include laser bars that are mounted parallel to each other.

Specifically, the diagram of FIG. 9A shows placement and orientation of arrays of lasers on multiple mounting plates $8cl_1$, $8cl_2$, $8cl_3$ with respect to axis of rotation stage Z in accordance with the presently disclosed subject matter. The plates can be arranged parallel to one another to provide for minimum laser beam spread. Each of the plates $8cl_1$, $8cl_2$, $8cl_3$ can be generally similar to the plate $8cl$ previously described and shown with respect to FIG. 8.

However, with particular reference to FIG. 9B, it is appreciated that, in other embodiments, the plates can be rotated with respect to each other to increase the (combined) laser beam's spread in vertical and/or horizontal planes, when compared to the spread of a laser beam emitted by an individual bar.

Yet another way to increase laser power is to introduce pulsed operation. In some embodiments, the semiconductor lasers are operated at peak power above continuous wave (CW) power, while pulse duration and duty cycle are small. The resultant laser junction temperature is lower in this pulsed mode, and the laser is more efficient.

Figure 10:
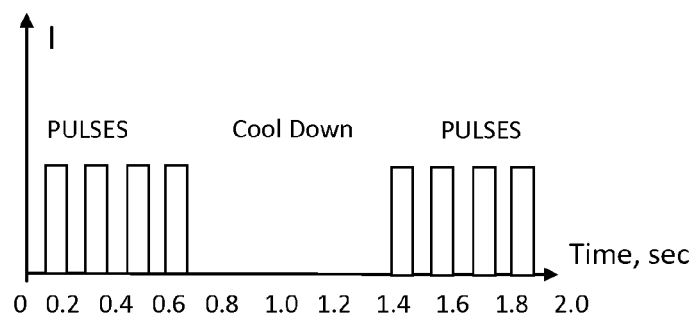
FIG. 10 is a schematic time diagram of laser operation, including multiple laser pulses and cool down period.

FIG. 10 shows a time diagram of laser operation, including trains of multiple laser pulses followed by cool down period. Short laser pulses, including even a single pulse in some embodiments, are sufficient to disturb operation of a control unit and to deflect a missile within less than a second. Afterwards, the laser may be switched off to allow for cooling, and to improve power consumption and thermal management.

Figure 11:
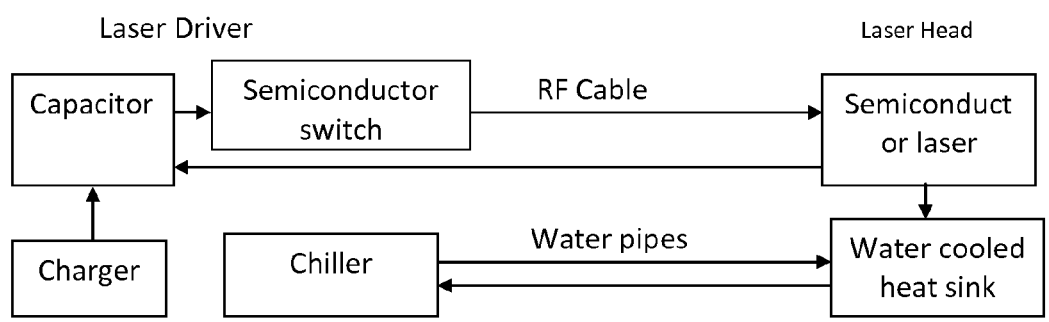
FIG. 11 is a schematic electrical and cooling layout of a conventional laser (prior art)

FIG. 11 shows a diagram of a discharge circuit and cooling of a conventional, prior art, pulsed laser. The laser consists of a laser driver and a laser head. The laser driver includes a capacitor for accumulation and storage of electrical energy, a charger for the capacitor and a chiller. The laser head includes laser diodes and cooling means such as a water based cooler. Water removes heat from the laser diodes. The chiller circulates and cools the water. The laser driver and laser head are connected by an RF cable. The laser head and the chiller are connected by pipes.

Figure 12:
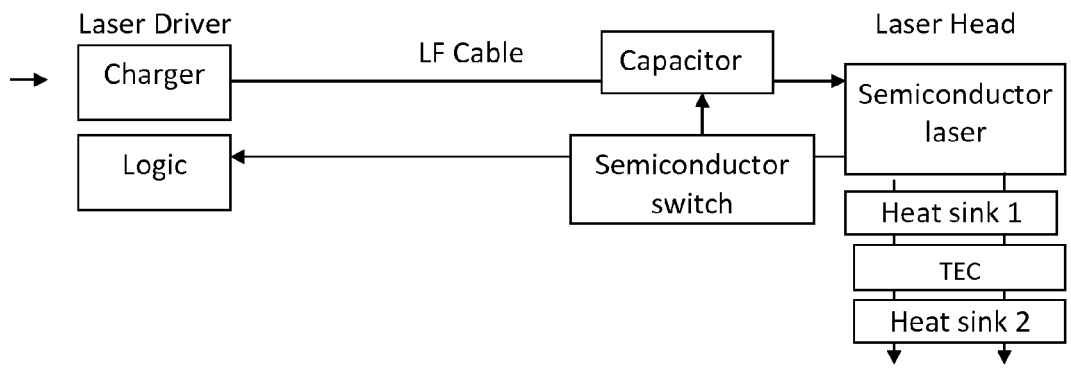
FIG. 12 is a schematic electrical and cooling layout of a laser according to the presently disclosed subject matter of the present application.

Reference is now made to FIG. 12 which shows an integrated discharge circuit and a cooling layout of the pulsed laser in accordance with the subject matter of the present application. The circuit includes a laser driver having a charger and a logic card, a laser head which includes semiconductor emitters, a semiconductor switch, a high frequency capacitor and cooling means.

The laser driver is configured for slowly charging the capacitor using relatively low charge current. The capacitor is discharged via a semiconductor laser using short pulses of high current. This configuration enables the discharge circuits to be lightweight, efficient and reliable due to their small dimensions. Small dimensions of the circuits and short wires have low resistance and low inductance. That facilitates efficient generation of short pulses. Connection of the laser driver and the laser head is simple, due to the simplified requirements.

The LF cable is a low frequency cable which is used for charging the energy storage capacitor/s. The charging process takes a longer time than the discharge process. For example, charging time can be 0.1 sec to 10 sec, while discharge time can be 100 nsec to 1 msec. Thus, time of charging can be, for example, 5-6 orders of magnitude longer, consequently requirements to cable frequency are significantly reduced, relative to the prior art.

One of the differences between the layout of the subject matter of the present application as shown in FIG. 12 and the layout of the prior art as shown in FIG. 11 lies in the location of the switch. Specifically, whereas in the conventional solution is shown in FIG. 11, the switch is a part of the laser driver, and the discharge circuit includes a cable connecting the laser driver and the laser head, according to the subject matter of the present application, the switch is a part of the discharge circuit of the energy storage capacitor/s via the semiconductor laser.

Reverting to FIG. 12, the switch and energy storage capacitor/s are shown located in the laser head. Overall dimensions of the discharge circuit are an order of magnitude less than in the conventional prior art solution. These dimensions are limited by dimensions of the semiconductor laser, of the switch and of the capacitor/s. Typical dimensions of a high power semiconductor laser and of semiconductor switch are about 1 cm. That is dimensions of discharge circuit are about 2 cm-3 cm, or two orders of magnitude less than for conventional prior art systems. It is possible to note that some elements of the conventional discharge circuit (such as the cable and connectors) are removed or altered. This makes the proposed system faster, more efficient, more reliable and less expensive.

Some advantages of the Integrated Discharge Circuit (IDC) of the presently disclosed subject matter over the prior art include shorter high power pulse width (for example 1 us instead of 100 us), better efficiency (discharge efficiency ~60%-80% instead of 20%-50%), better reliability, smaller dimensions of capacitors (~ smaller by 2-5 times), structural differences such as absence of cable and cable connectors, and others, as would be apparent to those skilled in the art.

In particular, the IDC arrangement disclosed in FIG. 12 allows, inter alia, the following advantages:
  reducing parasitic resistance, parasitic capacitance and parasitic inductance due to the shortening of the cable;
  reducing energy losses in the storage capacitor;
  reducing the cable's ability to operate as an antenna, thereby reducing radio frequency emissions;
  increasing the ability for generating short pulses;
  decreasing overshooting peaks of discharge current, and consequently reducing damage to the lasers;
  reducing resistance and losses;

It is noted that at least some of the above mentioned advantages are emphasized when pulse duration is less that 0.1 msec (or even 0.01 msec), and discharge currents is above 10 amps (or even 100 Amps), as in some embodiments of the presently disclosed subject matter.

In addition to the above, the total area of semiconductor active junctions of all emitters is above 100 square millimeters, sufficient to absorb heat generated during laser emission without increase of emitters' temperature and without liquid cooling.

Figure 13A:
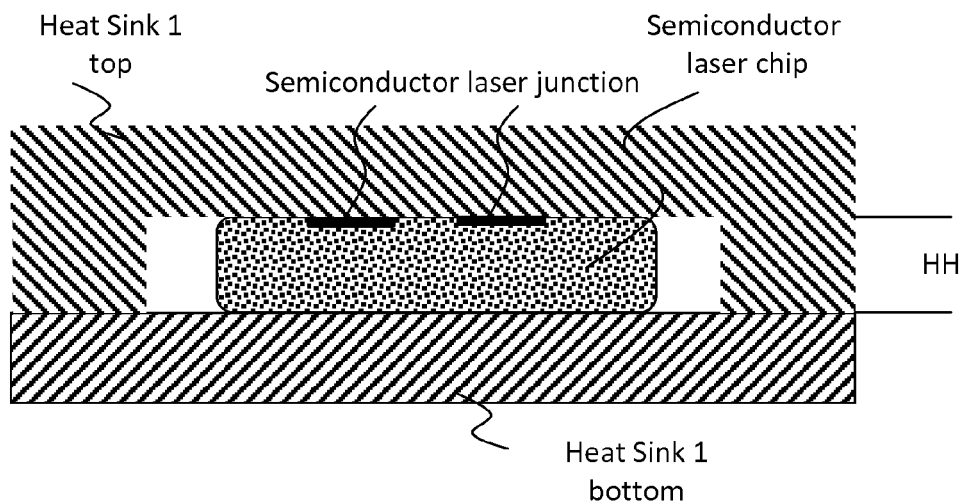
FIGS. 13A and 13B are schematic cross sectional views of two embodiments of mounting a semiconductor laser emitter providing cooling and preventing shocks and stress, in accordance with the subject matter of the present application.
Figure 13B:
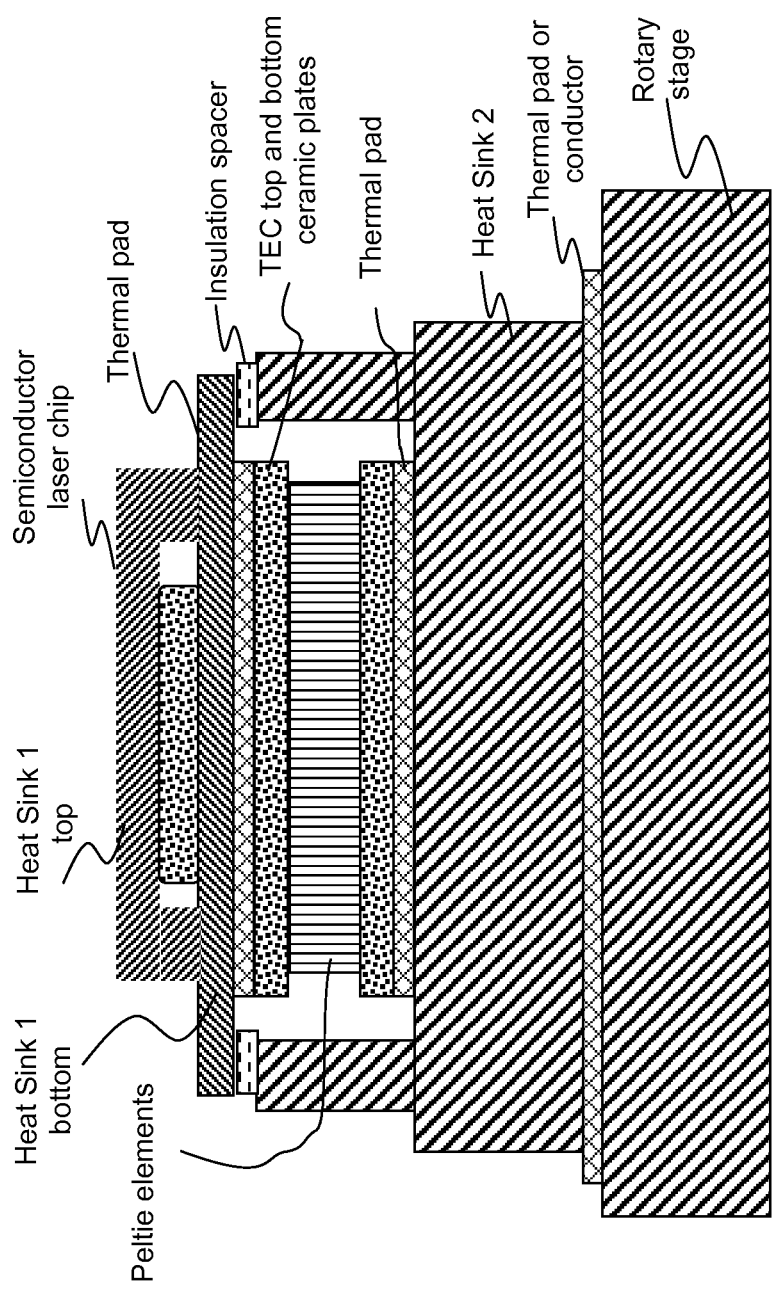
Figure 14:
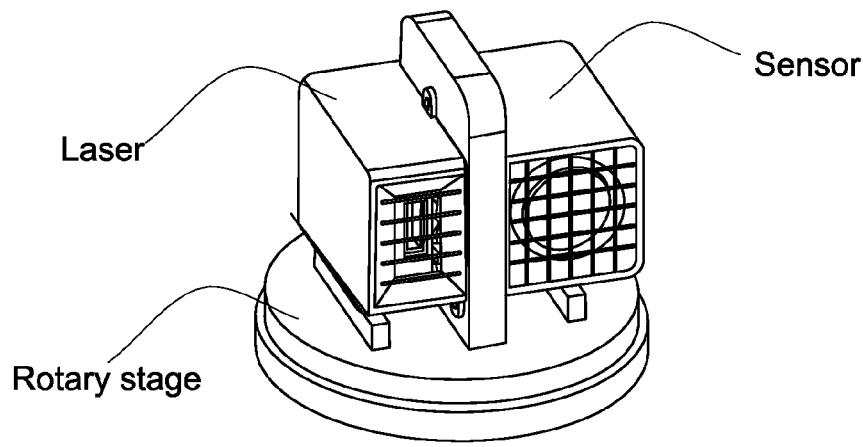
FIG. 14 is a schematic isometric view of a DIRCM system including a laser and a sensor mounted on a rotary stage.

Turning now to FIGS. 13A and 13B show an embodiment of the presently disclosed subject matter, which includes mounting of semiconductor lasers in a way to achieve durability to shock and vibrations while reducing thermal stress and providing heat extraction. This is achieved by sandwiching semiconductor lasers between precisely machined pieces of the heat sink 1, which is at least primarily comprised of metal.

The pieces are designed to form a cavity (spacing HH) that matches precisely thickness of the semiconductor laser (TS). Thickness of the laser TS is made less than spacing HH by few microns. In this manner, heat sink 1 stays attached to the laser all the time, while semiconductor laser is mechanically protected from stress, shocks and vibration by the particular shape and hardness of the heat sink. The semiconductor laser and the heat sink change their dimensions with temperature. This does not create stress and fracture in the elements, because they are not soldered one to the other. The parts stay fixed with respect to each other due to friction forces.

As can be seen in FIG. 13A, semiconductor laser junctions (diodes) are formed in semiconductor substrates (semiconductor laser chip in FIG. 13A). Heat generated in the semiconductor laser diodes is distributed within the semiconductor substrate material, which carries a function of heat capacitor and heat distributor. Dimensions and heat capacity of the semiconductor are large enough to absorb energy of a single laser pulse without significant increase of its temperature. The metal mounting plate serves as a first heat sink, together with the additional plate that serves as the first heat sink's top and is in thermal contact with the mounting plate, i.e. attached to it in this case. The semiconductor substrate (chip is not attached to the mounting plate or to the top, but is rather only placed thereon, thus preventing damage from varying thermal expansions of the metal mounting plate and the semiconducting substrate. However, it is appreciated that in some embodiments, the substrate can be made of metal and can be attached to the mounting plate, or even form a unitary piece.

With further reference to FIG. 13A, the laser emitters are clamped in place and fixed by friction forces without bonding, soldering or welding. The additional top plate can be added both to increase heat transfer from the substrate, and in some embodiments the laser diodes directly, and to support the substrate on an opposite side to the mounting plate, thus further making sure that it does not move and increasing the static friction that holds it in place. Thermal expansion of the substrate is still enabled in such embodiments by the fit between the substrate and the plates, and at its sides as shown if FIG. 13A. The heat-sink 1 in contact with the laser array only along two surfaces thereof so that the laser array can thermally expand to the sides. No movement is allowed during shocks, as attachment (friction) forces are stronger than shock (acceleration) forces.

A detailed structure of mounting and cooling of the laser chip is illustrated in FIG. 13B. The chip (substrate with diode/s) is enclosed in the heat sink 1. The heat generated in the laser junctions of the chip is transferred to the chip, than heat flows from the chip to the heat sink 1. A Thermo-Electric Cooler (TEC) transfers the heat from heat sink 1 (chip mount) to heat sink 2 (laser head basis). The TEC is externally powered. The heat sink 1 is mechanically fixed on and attached to heat sink 2. In this embodiments, thermal isolation pads are used to prevent flow of heat back from heat sink 2 to heat sink 1. Then the heat flows from heat sink 2 to the rotary stage, which itself functions as a large heat sink. The illustration does not include a platform, but the rotary stage is normally attached to the platform, which accepts heat from the rotary stage, thus serving as a 'third' heat sink in this embodiment.

As shown in FIG. 13B, heat is transferred from the semiconductor laser to the first heat sink 1 and this occurs during the relatively long intervals between the laser pulses. Dimensions and heat capacity of the first heat sink 1 are larger than the dimensions of the substrate and the semiconductor laser, consequently heat sink 1 can accumulate and transfer heat generated by many laser pulses. The heat sink 1 is mounted on a larger second heat sink 2. Heat is transferred from the heat sink 1 to the heat sink 2, where it is accumulated for a longer time, while the laser is operating. Heat is dissipated during cool down period (switched off period) of the laser.

The material of a chip (substrate) is a semiconductor crystal, for example GaAs or GaAlAs or other semiconductor, in this embodiment. Parts of heat sink 1 are made of copper or copper alloy. Thermal pads can be made of Indium or copper foils, or thermally conductive silicone rubber, or carbon thermal composites. Thermal isolation pads are made from materials having low thermal conductivity, such as fiber glass composites, kapton, polyimide foil. Heat sink 2 can be made of copper or copper alloys or of aluminum alloys. Aluminum is significantly lighter than copper, yet it has high thermal conductivity. Heat sink 3 (of rotary stage) can be made of aluminum alloy or of steel.

Figure 15A:
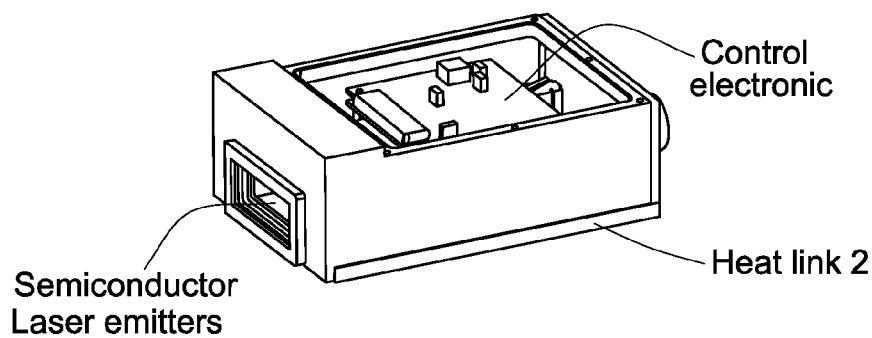
FIGS. 15A and 15B are schematic front and rear isometric views of some elements of the laser jammer shown in FIG. 14.
Figure 15B:
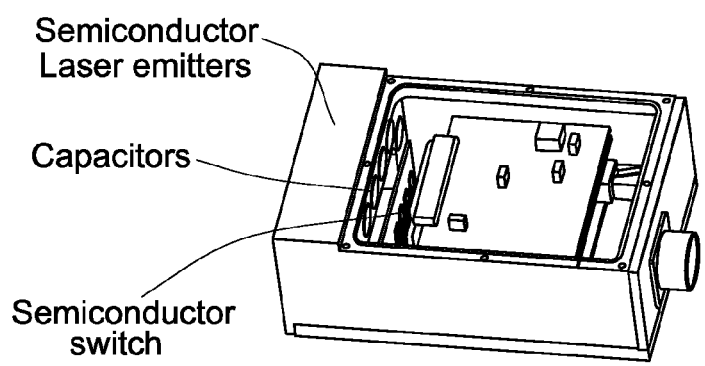
Figure 16:
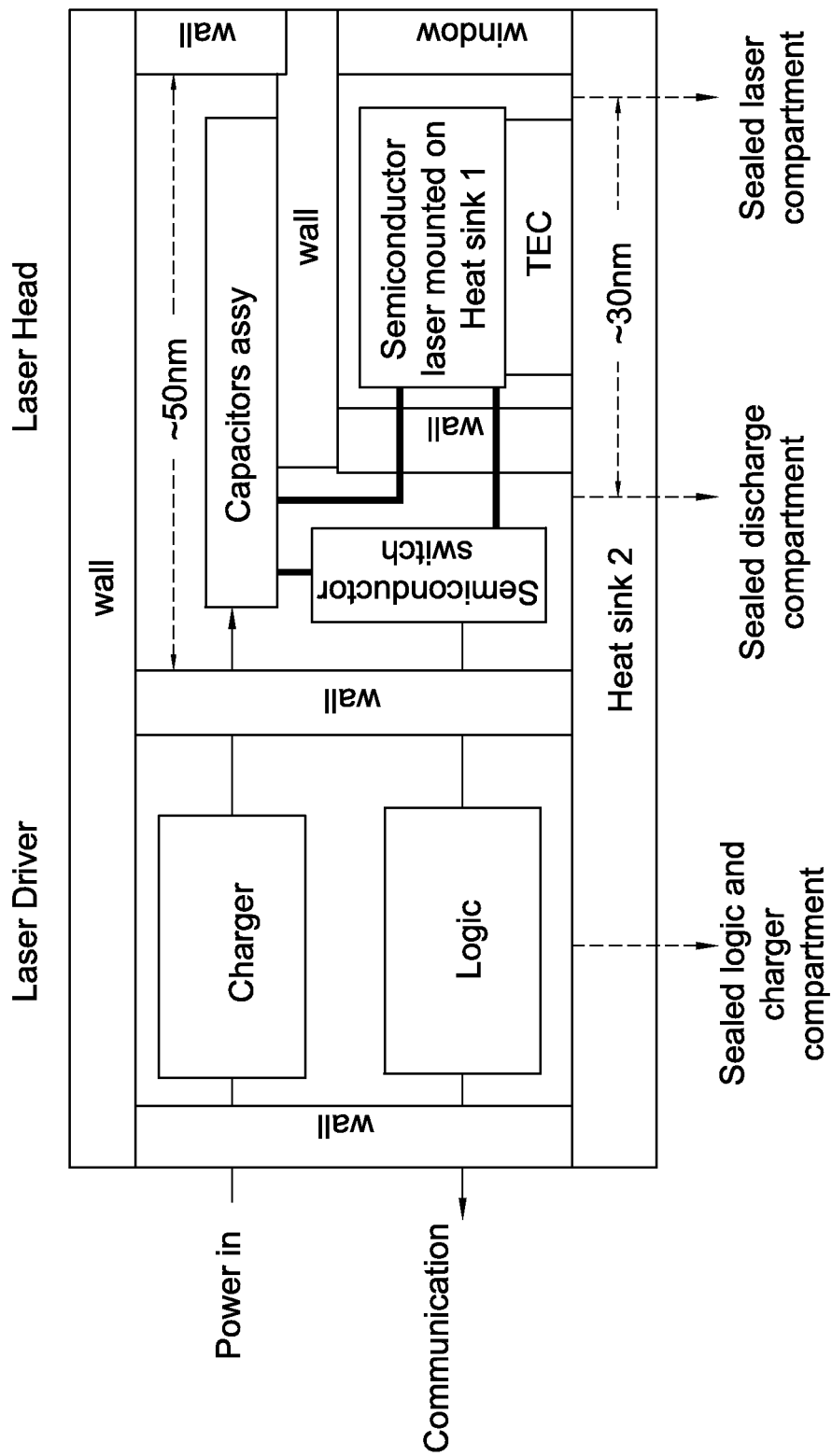
FIG. 16 is a schematic layout of several elements of the laser jammer shown in FIGS. 14 to 15B.

Turning now to FIGS. 15A, 15B and 16, a schematic illustration of an exemplary structure of a portion of a single unit laser jammer is shown, comprising three compartments. The discharge circuits are mounted on the rotation stage in close proximity to the laser emitters. It should be understood that the third compartment may also be separate from the first and second compartments or positioned in a separate unit. The laser head essentially includes a sealed compartment with semiconductor laser emitters, output window, heat sink and mounting interface. The laser head also includes whole discharge circuits including energy storage capacitors and discharge semiconductor switch.

Those skilled in the art to which this invention pertains will readily appreciate that numerous changes, variations, and modification can be made without departing from the scope of the invention, mutatis mutandis.

The invention claimed is:

1. A laser jammer configured for being a part of a countermeasure system, the laser jammer comprising:
    a laser source comprising at least two adjacent compartments each being hermetically sealed and having a wall therebetween hermetically separating the at least two adjacent compartments from each other;
    a first of the at least two adjacent compartments comprising therein a plurality of semiconductor laser emitters, and a second of the at least two adjacent compartments comprising therein capacitors electrically connected to the plurality of semiconductor laser emitters via electrical connections passing through the wall and connected to an external charger and a switch for activating the semiconductor laser emitters via the capacitors, which are configured for being discharged via the laser emitters with a discharge time being above 100 nsec;
    wherein at least one of the following conditions are met:
    the laser source is configured to provide laser pulses having a peak power above 100 Watts, and having a leading edge of laser pulse duration of less than 5 microseconds;
    the laser source is configured to provide a laser pump current amplitude above 100 Amperes, and having a leading edge of laser pulse duration of less than 5 microseconds; or
    the laser source having a peak specific optical laser power of at least 10 Watts/CC.

2. The laser jammer according to claim 1, wherein the plurality of semiconductor laser emitters emit laser emitter beams forming together a combined laser beam having a predetermined spread along its optical axis.

3. The laser jammer according to claim 1, wherein the laser source includes an IR laser source.

4. The laser jammer according to claim 3, wherein the laser source is configured for emitting the laser beam with a predetermined spectral distribution at least a portion of which is in a range from 780 nm to 4300 nm.

5. The laser jammer according to claim 4, wherein the predetermined spectral distribution is non-continuous.

6. The laser jammer according to claim 1, wherein the laser source is configured for emitting a laser beam in at least one pulse being no longer than 5 seconds.

7. The laser jammer according to claim 1, wherein the plurality of semiconductor laser emitters have at least two of size, mass, or volume, which are the same for at least a majority of the plurality of semiconductor laser emitters.

8. The laser jammer according to claim 1, wherein the plurality of semiconductor laser emitters are arranged along two dimensions of the laser source.

9. The laser jammer according to claim 1, wherein the plurality of semiconductor laser emitters include laser diodes.

10. The laser jammer according to claim 9, further comprising a plurality of substrates each of which holds at least one of the laser diodes.

11. The laser jammer according to claim 1, further comprising LEDs in the visible spectrum.

12. The laser jammer according to claim 11, wherein the LEDs are configured to produce a beam directed along the same optical axis as a laser beam of the laser source and/or having a predetermined spread similar to that of the laser beam.

13. The laser jammer according to claim 1, wherein the plurality of semiconductor laser emitters are installed at a distance of no more than 10 cm from the capacitors.

14. The laser jammer according to claim 1, wherein the plurality of semiconductor laser emitters are connected to the capacitors by electrical connectors that are no longer than 10 cm.

15. The laser jammer according to claim 1, wherein the at least two adjacent compartments have walls made of cast glass.

16. The laser jammer according to claim 2, wherein the laser beam is spectrally uniform at least at a majority of its spread, at the predetermined distances, and a minimum intensity of laser radiation in the majority of the spread is more than 50% of an average intensity of laser radiation in the majority of the spread, at the predetermined distances.

17. The laser jammer according to claim 1, further including a third compartment adjacent to the second compartment, the third compartment being hermetically sealed and comprising therein a logic card configured to activate the switch and the charger configured to charge the capacitors.

* * * * *